United States Patent [19]
Realis Luc et al.
[11] Patent Number: 4,746,937
[45] Date of Patent: May 24, 1988

[54] CONTROL APPARATUS FOR AN ON-DEMAND INK JET PRINTING ELEMENT

[75] Inventors: Roberto Realis Luc, Ivrea; Alessandro Crotti, Strambino, both of Italy

[73] Assignee: Ing. C. Olivetti & C., S.p.A., Turin, Italy

[21] Appl. No.: 866,246

[22] Filed: May 23, 1986

[30] Foreign Application Priority Data

Jun. 10, 1985 [IT] Italy .............................. 67537 A/85

[51] Int. Cl.[4] .............................................. G01D 15/16
[52] U.S. Cl. .................................................. 346/140 R
[58] Field of Search ............... 346/140 R, 140 RD, 75

[56] References Cited

U.S. PATENT DOCUMENTS 4,490,728 12/1984 Vaught et al. .............. 346/140 R X
4,491,851 1/1985 Mizuno et al. ........................ 346/1.1

*Primary Examiner*—E. A. Goldberg
*Assistant Examiner*—Mark Reinhart
*Attorney, Agent, or Firm*—Banner, Birch, McKie & Beckett

[57] ABSTRACT

In an ink jet printing element in which the drop is expelled by generating a current pulse through the ink in the nozzle, in order to reduce the control voltage, a first pulse (Tr) for heating the ink is generated, followed by a vaporization pulse (Tv) with a delay such as to make the printing position independent of the direction of movement of the element with respect to the paper. The heating pulse (Tr) is generated by a circuit (31) controlled by a temperature sensor (34) so that the duration of the heating pulse has a negative temperature coefficient. The vaporization pulse (Tv) is generated by a circuit (32) manually controlled (potentiometer 39) to determine the pulse duration on the basis of the desired strength of the printing. The delay between the two pulses is controlled by a delay circuit (38), e.g. a monostable circuit. The two pulses are applied to a transformer (35) which generates the voltage between the electrodes. The two circuits (31, 32) may be constituted by one monostable circuit with separate RC networks sequentially enabled for determining the durations of the heating and vaporization pulses.

10 Claims, 3 Drawing Sheets

CONTROL APPARATUS FOR AN ON-DEMAND INK JET PRINTING ELEMENT

BACKGROUND OF THE INVENTION

The present invention relates to a control apparatus for an on-demand ink jet printing element in which printing is effected by producing from a logic signal an electrical current such as to increase the temperature of the ink disposed in a nozzle, in which a first pulse is generated to raise the temperature of the ink in the nozzle to close to the vaporization point and a second pulse is generated to create a bubble of vapour in the nozzle so as to cause a drop of ink to be expelled through the nozzle.

In a printing arrangement as disclosed in British patent specification GB No. 2 106 039, the current passes through a resistor disposed in the nozzle in the vicinity of the outlet edge. Two pulses are generated one after the other by two different voltages whereby they are of fixed duration. Upon a variation in ambient temperature therefore, the effect of the two pulses on the drop of ink also varies, so that the strength of the printing increases with ambient temperature.

SUMMARY OF THE INVENTION

The object of the present invention is to generate a pair of pulses which are such that their effect on the drop is substantially independent of ambient temperature.

The invention accordingly provides a control apparatus of the above type, wherein the ink is electrically conductive and the pulses generate current between a first electrode in contact with the ink and a second electrode disposed adjacent the outlet edge of the nozzle, and in that it comprises a first circuit controlled by a logic signal and operable to produce the first pulse of a duration which is inversely proportional to temperature, and a second circuit which is controlled by the logic signal by way of a delay circuit. The apparatus may comprise a stobe signal generator and means for generating a signal of the duration such as to generate the print at the moment which is equidistant in respect of time between the two consecutive strobe signals whereby a given position of printing of the dot is independent of the direction of displacement of the printing element with respect to the paper.

BRIEF DESCRIPTION OF THE DRAWINGS

The invention will be described in more detail, by way of example, with reference to the accompanying drawings, in which.

DESCRIPTION OF THE PREFERRED EMBODIMENTS

Figure 1:
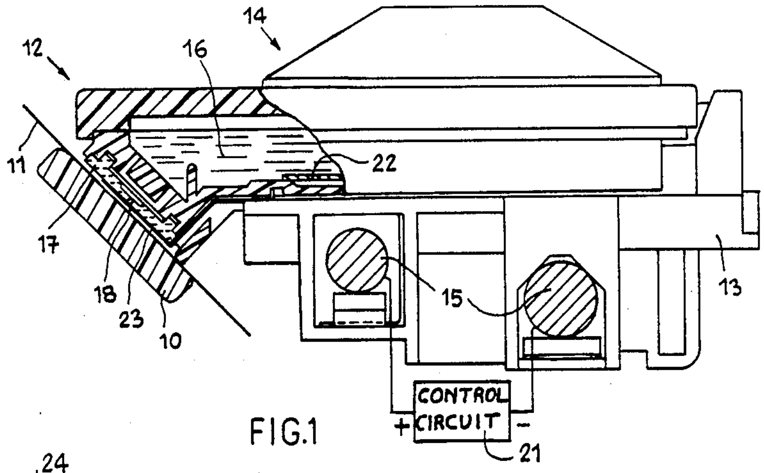
FIG. 1 is a diagrammatic view in section of an on-demand ink jet print head incorporating control apparatus embodying the invention.

Referring to FIG. 1, a support bar 10 supports a sheet of paper 11 which is moved vertically to permit the printing of dots in successive elementary rows, for example for dot matrix alphabetic printing.

The printer comprises an on-demand ink jet printing head 12 and which is mounted on a carriage 13 movable tranversely with an alternating movement on two guides 15 in known manner per se. The head 12 essentially comprises a container 14 of insulating material for the ink 16 which is electrically conductive. The container 14 is closed towards the support 10 by a plate 17 in which there is provided a nozzle 18 for expelling particles of ink 16.

The printer comprises an electrical control circuit 21, which supplies (by way of the guides 15) electrical voltage pulses between a first electrode 22 in contact with the ink 16 and a second electrode 23 which is adjacent to the nozzle 18 on the plate 17, substantially in the manner described in U.S. Pat. No. 4,630,077, assigned to the same Assignee of this invention.

Figure 2:
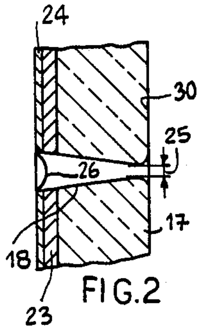
FIG. 2 is a view in section on a highly enlarged scale of a detail of the printing element.

The plate 17 is about 0.6 mm in thickness and in its central part has a circular portion which is reduced in thickness to about half, being for example about 0.35 mm. Disposed on the outside surface of the plate 17 (see FIG. 2) is a layer of conductive material which is between 40 and 50μ in thickness and which constitutes the electrode 23, being covered by a layer 24 of glass which is between 15 and 20μ in thickness. The plate 17 which is covered in that way is bored by means of a laser beam so as to produce the nozzle 18 with a minimum section 25 of between 25 and 35μ, at about 50μ from the inside surface 30 of the plate (see also FIG. 5). The ink normally fills the nozzles 18 by capillary action, forming a meniscus 26 (see FIG. 2) at the outside surface.

When the electrodes 22 and 23 are supplied with a voltage pulse whose energy is given by $$E = \int \frac{V^2}{R} dt,$$

the resulting current passing through the ink causes an increase in temperature, the increase in temperature increasing in direct relationship to the curent density. The current density is high in the nozzle 18 and is at a maximum in the region of the most restricted section 25 of the nozzle 18. Thus, in that region a vapour bubble is generated, which causes expulsion of the ink 16 which is between the bubble and the meniscus 26. The energy required to produce the expulsion effect is of the order of 200 to 300 μJ, which can be obtained with a voltage wave with a peak of about 2500 to 3000 V.

Normally, with the known arrangements, vaporization occurs slightly after the maximum value of the voltage wave. Thus, during the expansion process, the nozzle 18 is still subjected to a high voltage which can continue to supply energy, making that phase particularly violent. That therefore promotes the introduction of air after explusion of the drop of ink, which causes disturbances in the emission process until the ink has re-filled the nozzle 18. However preheating of the ink stabilizes the boiling point of the ink.

It should also be noted that the energy required for vaporization varies with the initial temperature of the ink and thus with ambient temperature. Therefore, if the circuit 21 is calibrated for a given ambient temperature, when the ambient temperature drops, the energy provided could reduce the strength of the printing or could be downright insufficient for expulsion of the ink, while if the ambient temperature rises, such energy could cause premature expuslion and give rise to an undesirable increase in the strength of the printing.

The aim of the present invention is to reduce the voltage required for expelling the drop of ink, to avoid the introduction of air into the nozzle and to make the strength of the printing independent of the ambient temperature.

Figure 3:
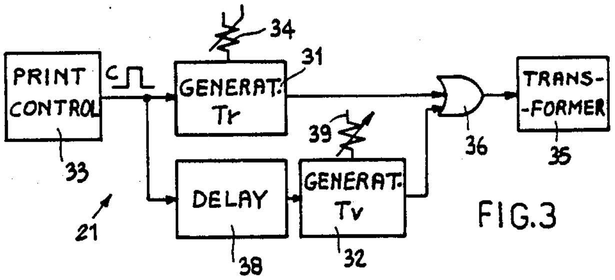
FIG. 3 is a block circuit diagram of a first embodiment of the control apparatus.

In accordance with a first embodiment of the invention, the control apparatus 21 comprises two circuits 31 and 32 (see FIG. 3) which are arranged to be controlled by a logic signal emitted by a print control unit 33 to generate two separate control pulses. In particular, the generator 33 emits a logic signal C given by a print position encoder which is known per se and which is not shown in the drawings. The rising and falling edges $S_1, S_2 \ldots S_n, S_{n+1}$ (see FIG. 8) of that signal form the strobe signal. They are odd in number whereby the signal 33 starts from the left-hand margin at a low level and terminates at the right at a high level. The circuit 31 (see FIG. 3) is controlled directly either by the rising edge or by the falling edge of the logic signal from the unit 33, under the control of a counter which disables the last edge of each line.

Figure 4:
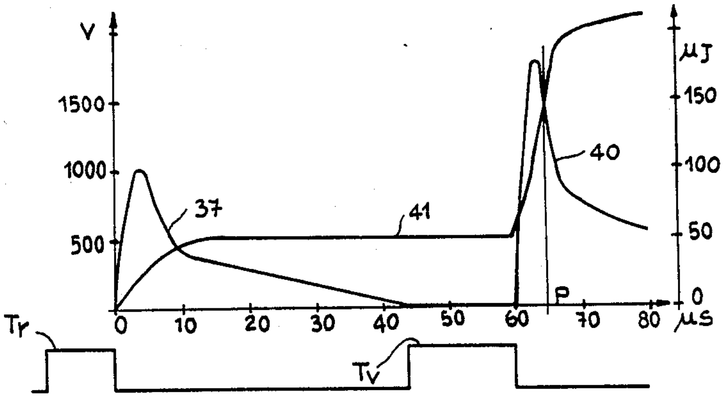
FIG. 4 shows a diagram illustrting the voltage and the relative energy of the control pulses generated by the circuit shown in FIG. 3.

The circuit 31 comprises an automatic temperature regulator 34 of the NTC (negative temperature coefficient) type such that the duration of the pulse is inversely proprotional to the variations in ambient temperature and thus, with a certain degree of approximation, to the variations in the temperature of the ink. The pulse generated by the circuit 31 is identified by Tr in FIG. 4 and is passed to a transformer 35 (see FIG. 3) by way of an OR-circuit 36. The transformer 35 is of the high-voltage indirect transfer (fly back) type and at the secondary side produces a voltage wave whose peak is substantially proprotional to the charging time at the primary side and thus the duration of the control pulse. The pulse emitted by the secondary winding of the transformer 35 is of the configuration indicated by the curve 37 in FIG. 4 and reaches a peak voltage of around 1000 V. That serves for preheating the ink in the region of the nozzle 18 in which the bubble is to be formed, to a predetermined and constant temperature which is to be slightly lower than the vaporization temperature.

The circuit 32 (see FIG. 3) is controlled by the logic signal from the unit 33 by way of a delay circuit 38 which is so adjusted as to cause the circuit 32 to generate a second pulse Tv (see FIG. 4) with a predetermined delay with respect to the logic signal. In particular, the delay circuit 38 must be adjusted in such a way that the delay between the end of the first pulse Tr and the beginning of the second pulse Tv is between 10 $\mu$sec and 100 $\mu$sec. The minimum value is imposed by the fact that at the primary winding, after the first pulse, there are oscillations which could influence the second pulse; the maximum value is due to the fact that the ink in the nozzle cools down in the course of time.

The circuit 32 (see FIG. 3) comprises a potentiometer 39 which can be actuated manually for varying the duration of the second pulse Tv on the basis of the desired strength of printing. The second pulse Tv, by means of the OR-gate 36 (see FIG. 3) is applied to the transformer 35 which at its secondary winding emits a voltage pulse of the configuration indicated by the curve 40 (see FIG. 4), and reaches a peak voltage of about 1700 to 1800 V, which is sufficient for emission of the drop of ink. That emission takes place immediately after the peak of the pulse 40, at the time indicated at P in FIG. 4. The curve 41 represents the level of the energy supplied by the secondary winding of the transformer 35, which results from the sum of the energy generated by the two pulses 37 and 40.

Figure 5:
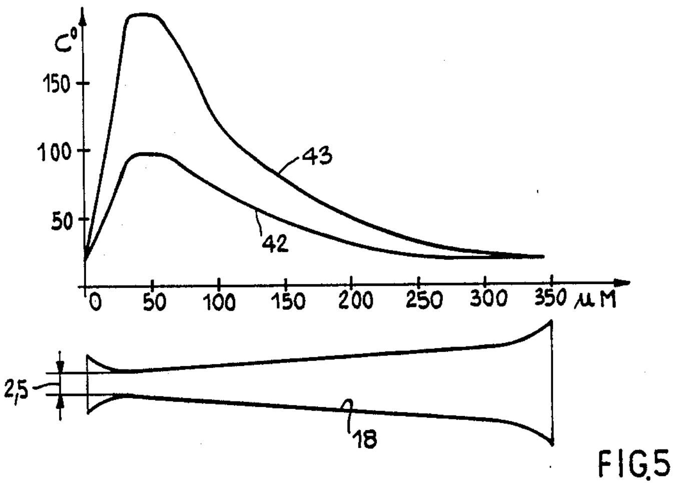
FIG. 5 is a diagram relating to the effect produced by the control pulses in the nozzle.

FIG. 5 shows the configuration of the nozzle 18 and corresponding thereto a curve 42 indicating the distribution of temperatures along the nozzle 18 which are due to the pulse 37, as well as a curve 43 indicating the distribution of temperatures along the nozzle 18 which are due to the pulse 40.

Figure 6:
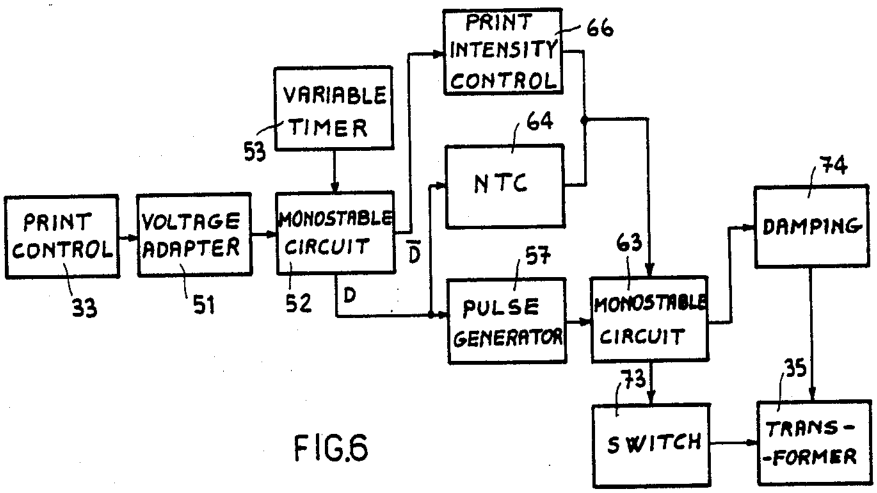
FIG. 6 is a block circuit diagram of a second embodiment of the control apparatus.

In accordance with a second embodiment of the invention, the logic signal from the control unit 33 is passed to a voltage adapter 51 (see FIG. 6) for adapting the voltage of the signal, in order to go from a signal at 5 V to a signal at 12 V. The adapter 51 is connected to a first monostable circuit 52 which is capable of generating a signal D whose duration is controlled by a variable timing circuit 53. That duration corresponds to the desired delay between the first and second control pulses Tr and Tv (see FIG. 4).

Figure 7:
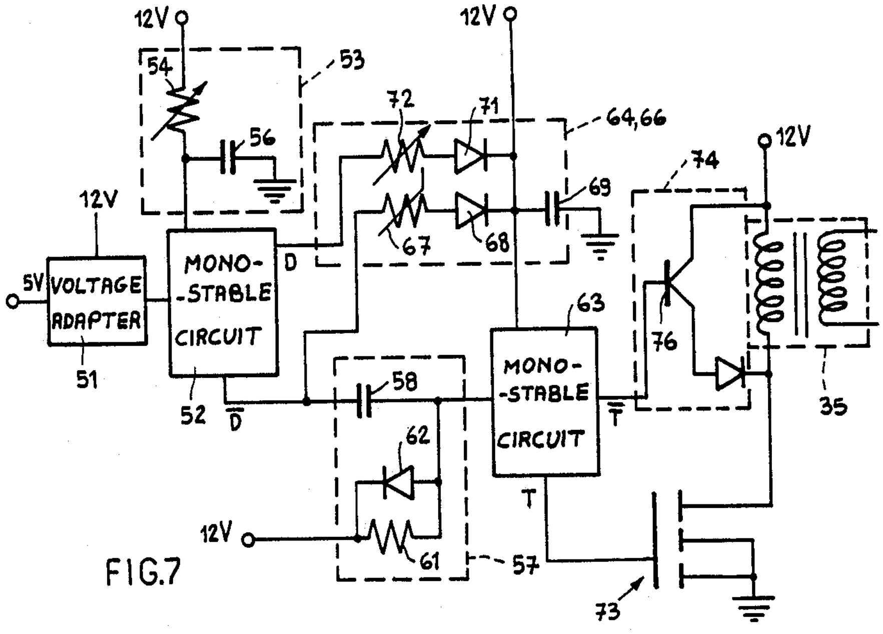
FIG. 7 is a detalied circuit of the control apparatus shown in FIG. 6.

In particular, the circuit 53 comprises a potentiometer 54 (see FIG. 7) connected to the 12 V feed voltage, and a capacitor 56. The duration of the signal D is proportional to the product of the resistance by the capacitance of the circuit 33 and is regulated in dependence on the speed of transverse movement of the carriage 13 (see FIG. 1). That duration is regulated in such a way that the time P (see FIG. 8) of emission of the drop falls precisely halfway between two strobes $S_n$ and $S_{n+1}$. Therefore at the time P the nozzle 18 is disposed in front of the same printing position whether the carriage 13 (see FIG. 1) moves from left to right or whether it moves from right to left.

Figure 8:
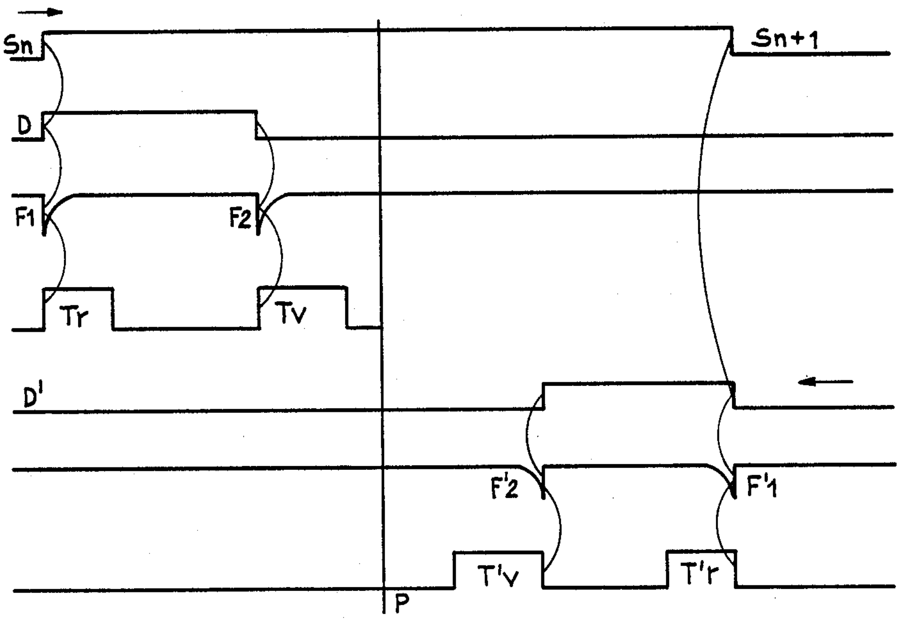
FIG. 8 is a diagram representing the synchronization signals generated by the circuit shown in FIGS. 6 and 7.

In FIG. 8, the signals generated in the event of movement of the carriage from right to left, being generated for example from the strobe $S_{n+1}$, are indicated by the same references as those generated in the movement of the carriage towards the right, but with the addition of primes.

The signal D which is generated by the monostable circuit 52 (see FIG. 6) controls a pulse generator circuit 57 which is operable to generate a signal F1 (see FIG. 8) in response to the rising edge of the signal D and a signal F2 in response to the falling edge of that signal. The circuit 57 comprises a capacitor 58 (see FIG. 7) connected to the 12 V voltage by means of a resistor 61 and a diode 62.

The two signals F1 and F2 activate a second monostable circuit 63 (see FIG. 6) so as to generate the two signals Tr and Tv under the control of two corresponding circuits 64 and 66. The circuit 64 comprises an automatic temperature regulator 67 (see FIG. 7) of NTC type, which is connected by way of a diode 68 to a capacitor 69. It causes the monostable circuit 63 to generate the signal Tr (see FIG. 8) whose duration is proportional to the product of the resistance of the NTC unit 67 (see FIG. 7) by the capacitance of the capacitor 69. The circuit 66 comprises a diode 71 and a potentiometer 72 which is adjustable by hand in accordance with the desired strength of printing. It causes the monostable circuit 63 to generate the signal Tv of a duration proprotional to the product of the reistance of the potentiometer 72 by the capacitance of the capacitor 69.

The signals Tr and Tv are operable to close a switch 73 of the type comprising field effect transistors, for example a switch IRFD110 which is produced by the company International Rectifier. The swtich 73 thus closes the circuit of the primary winding of the transformer 35 and causes the secondary winding to generate the corresponding voltage pulses 37 and 40 (see FIG. 4), as in the case of the circuit shown in FIG. 3.

Disposed between the ends of the primary winding of the transformer 35 is a damping circuit 74 (see FIGS. 6 and 7) comprising a transistor 76 whose base is controlled by the negated signal issued by the monostable circuit 63, that is to say in the absence of the signals Tr and Tv. The purpose of the circuit 74 is to damp the oscillations of the primary winding of the transformer 35 after each voltage pulse emitted by the secondary winding.

We claim:

1. A printing apparatus having at least one on demand ink jet printing element comprising a container made of insulating material for containing an electrically conductive ink, said container having a nozzle, a first electrode in contact with the ink, and a second electrode located adjacent the outlet edge of said nozzle, said apparatus also comprising printing control means for generating voltage pulses between said first electrode and said second electrode to create an electric current in the ink so as to cause a drop of ink to be expelled through the nozzle, wherein said printing control means include:

- a signal generator for generating a logic signal for each drop to be expelled,
- a first circuit directly responsive to said logic signal for generating a first voltage pulse having such a duration as to raise the temperature of the ink into the nozzle up to close to the vaporization point of the ink,
- a delay circuit connected to said signal generator for outputting a signal delayed with respect to said signal a predetermined time,
- a second circuit responsive to said delayed signal for generating a second voltage pulse so as to suddenly create a bubble of vapor in the nozzle to expel a drop of ink, and
- adjusting means substantially responsive to the ink temperature for controlling said first circuit so as to alter the duration of said first voltage pulse an amount inversely proportional to the variations of said ink temperature.

2. Apparatus according to claim 1, characterised by manually adjustable means (39 or 72) for varying the duration of the second pulse (Tv) in order to vary the strength of printing of the element.

3. Apparatus according to claim 1, wherein said first and second circuits are adapted to generate voltage pulses having equal voltage and different duration, the first and second circuits controlling said electrodes by way of a transformer whose secondary winding emits voltage pulses of a value corresponding to the duration of the pulses (Tr, Tv) provided by the circuits.

4. Apparatus according to claim 1, comprising a generator for generating strobe signals corresponding to the print positions of the element, characterised in that the delay circuit (52) provides a delay such that the second pulse (Tv) produces the emission of a drop at a time which is equidistant in respect of time from the time at which two consecutive strobe signals are generated, whereby printing is synchronized by the strobes independently of the direction of movement of the element with respect to the paper.

5. Apparatus according to claim 4, characterised in that the delay circuit (52) comprises a monostable circuit and an adjustable RC coupling (53) for determining the delay.

6. Apparatus according to claim 4, characterised in that the first and second circuits each comprise a potentiometer (67, 72) for regulating the duration of the respective pulses, the potentiometers being coupled in sequence to a common capacitor (69) under the control of the delay circuit (52) to cause the first and second pulses (Tr, Tv) to be emitted by a second monostable circuit (63) with durations determined by the respective potentiometers.

7. Apparatus according to claim 6, characterised in that the second monostable circuit (63) actuates a switch (73) connected to the primary winding of a transformer (35) whose secondary winding is connected to the first and second electrodes (22, 23), the secondary winding emitting voltage pulses of a value corresponding to the duration of the first and second pulses (Tr, Tv).

8. Apparatus according to claim 7, characterised in that the second monostable circuit (63) also controls a circuit (74) for damping the oscillations of the primary winding of the transformer (35) in between the first and second pulses (Tr, Tv).

9. An apparatus according to claim 1, wherein said adjusting means is a temperature regulator of the negative temperature coefficient type.

10. An apparatus according to claim 1, wherein said first and second circuits are adapted to generate each one a voltage pulse having constant voltage and different adjustable duration, said circuits being connected to said electrodes by drive means adapted to generate pulses having voltages of value corresponding to the duration of the pulses provided by said circuits.

* * * * *